Figure 1:
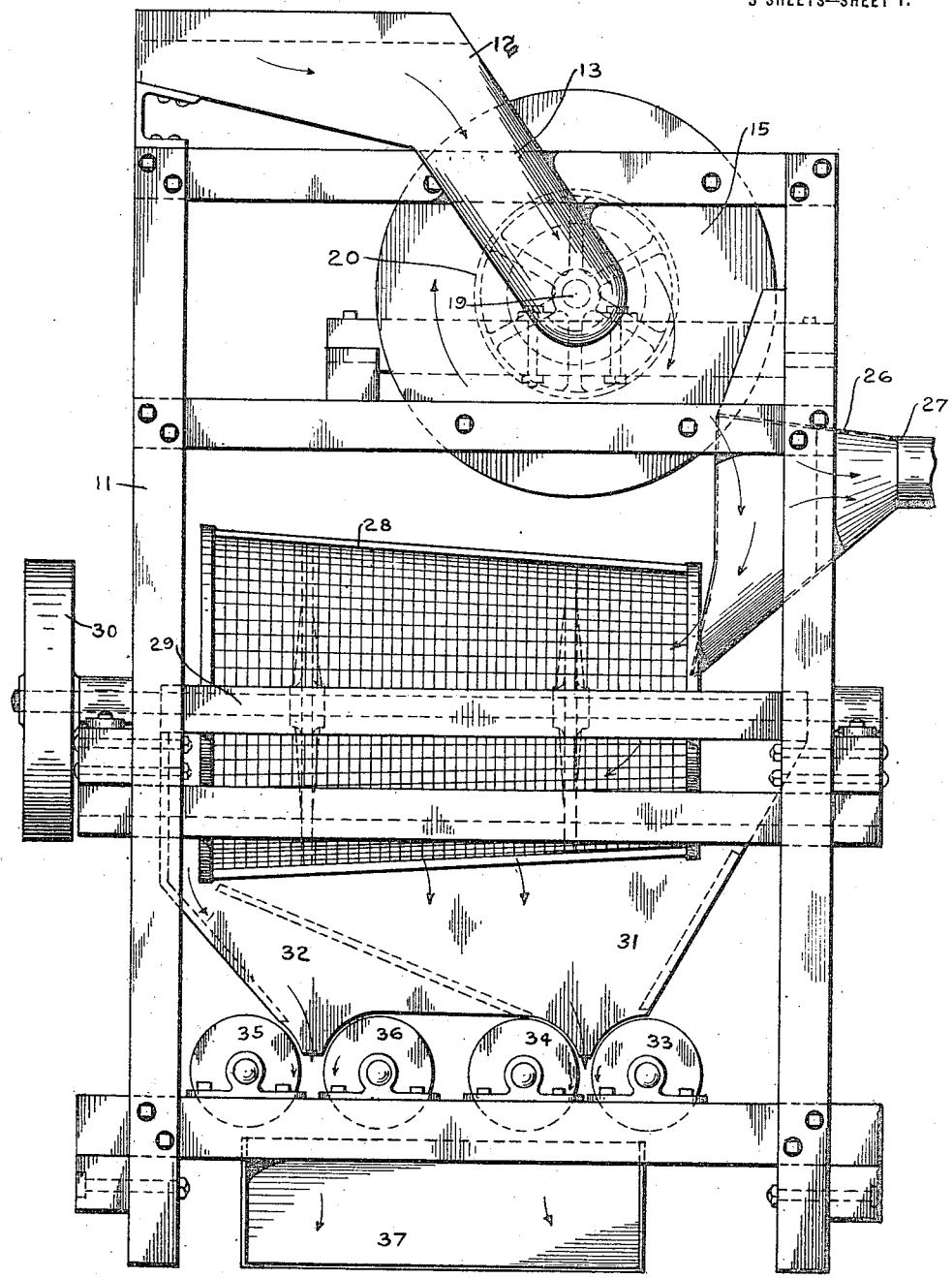

J. C. PATTERSON.
PROCESS AND APPARATUS FOR TREATING FROST-BITTEN OR IMMATURE COTTON BOLLS.
APPLICATION FILED OCT. 30, 1915.

1,259,661.

Patented Mar. 19, 1918.
3 SHEETS—SHEET 1.

Inventor:
James Carlton Patterson
By his Attorney
Edmond Congar Brown

J. C. PATTERSON.
PROCESS AND APPARATUS FOR TREATING FROST-BITTEN OR IMMATURE COTTON BOLLS.
APPLICATION FILED OCT. 30, 1915.
1,259,661.
Patented Mar. 19, 1918.
3 SHEETS—SHEET 2.
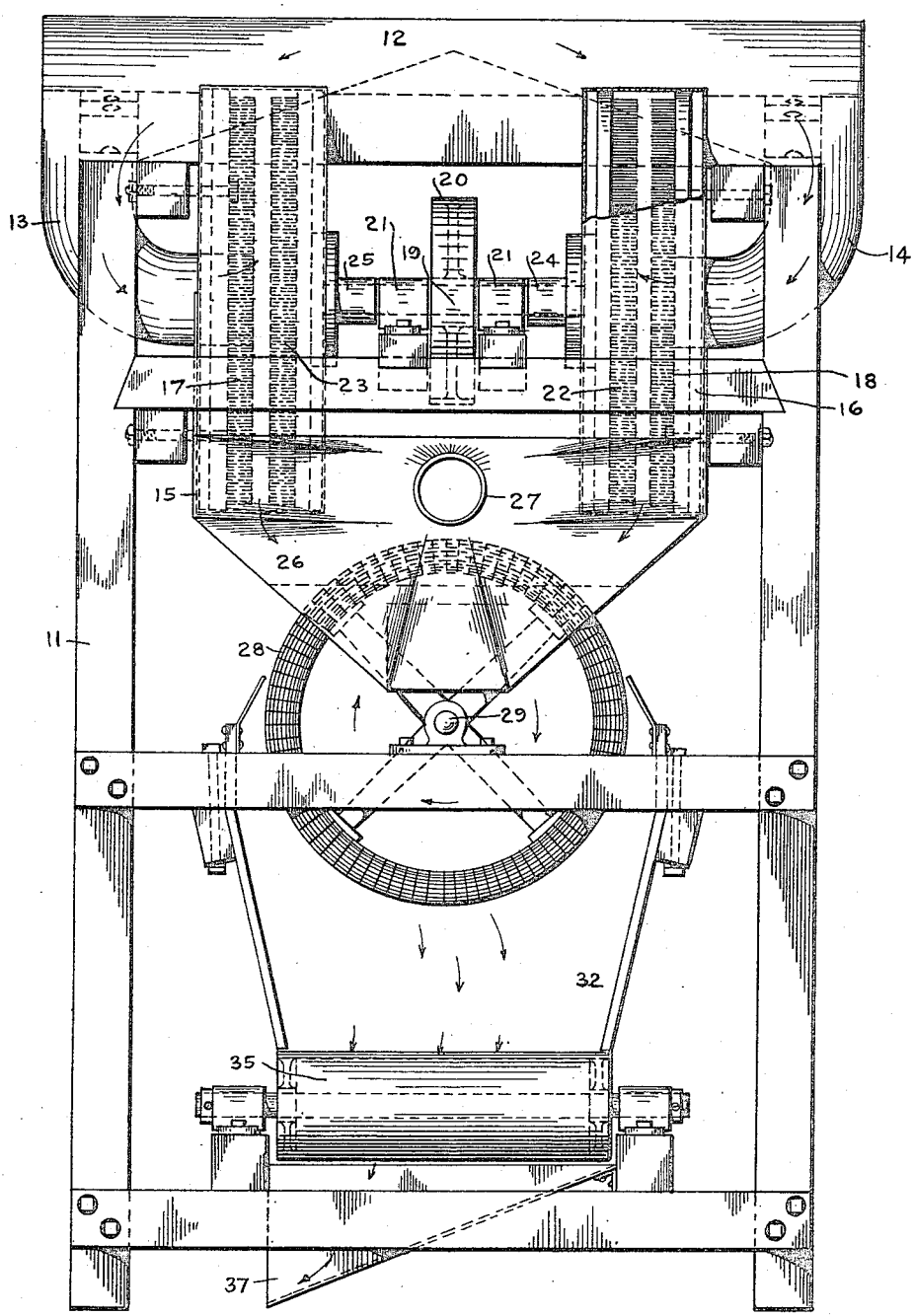

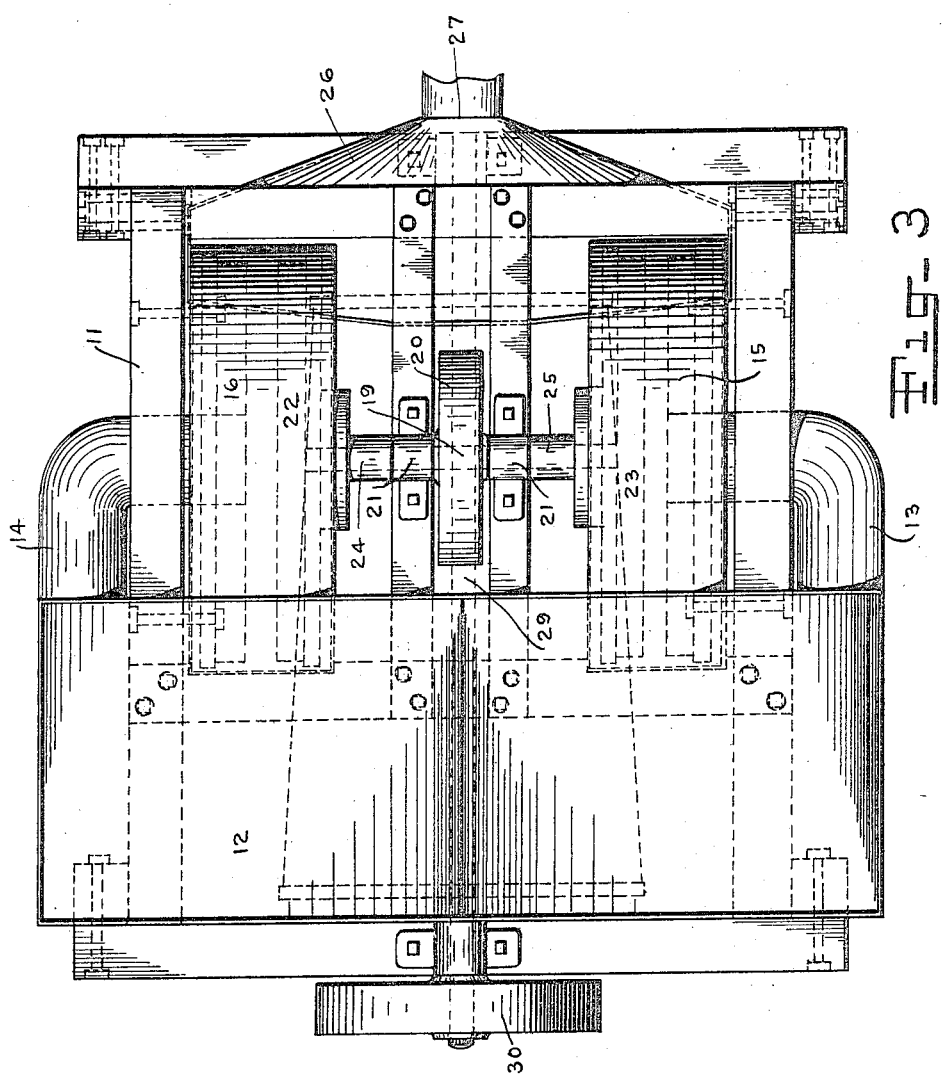

UNITED STATES PATENT OFFICE.

JAMES CARLTON PATTERSON, OF BALTIMORE, MARYLAND, ASSIGNOR TO STANDARD COTTON COMPANY OF AMERICA, A CORPORATION OF DELAWARE.

PROCESS AND APPARATUS FOR TREATING FROST-BITTEN OR IMMATURE COTTON-BOLLS.

1,259,661.     Specification of Letters Patent.     Patented Mar. 19, 1918.

Application filed October 30, 1915. Serial No. 58,877.

*To all whom it may concern:*

Be it known that I, JAMES CARLTON PATTERSON, a citizen of the United States, and a resident of the city of Baltimore, State of Maryland, have invented certain new and useful Improvements in Processes and Apparatus for Treating Frost-Bitten or Immature Cotton-Bolls, of which the following is a specification.

In the culture of cotton, it sometimes happens that by reason of an early frost or from some other cause a portion of the crop fails to mature. These frost-bitten or immature bolls are not only a loss to the grower, but are dangerous because if left in the fields they are apt to harbor boll-weevil. It has been found, however, that if these frost-bitten or immature bolls are artificially dried out and matured, they will open and the cotton fibers within will be fluffed out, and cotton bolls are thus sometimes treated in a drying machine which is already known in the art.

In the methods heretofore known, however, of treating the cotton-bolls there have been several disadvantages. In the first place, the leaves which are attached to the cotton boll remain thereon and are liable to become eventually mixed with the cotton fiber, and in the second place, the moisture which is contained in the interior of the cotton boll has no means of escape until the outer hull has been sufficiently dried to crack open, and therefore not only is the process of drying the bolls unduly prolonged, but the confined and heated moisture injures the fiber.

My invention relates to processes and apparatus for treating frost-bitten or immature cotton bolls, and has for its principal object to obviate the disadvantages mentioned in the last paragraph, by means of a treatment of the bolls preliminary to the maturing process above referred to.

The invention consists in the novel construction, arrangement and combination of various devices, elements and parts, as shown in the accompanying drawings and fully described in this specification.

In the said drawings, Figure 1 is a side view of an apparatus adapted to carry my invention into effect; Fig. 2 is an end view of the same; and Fig. 3 is a plan view.

In carrying my invention into effect in the embodiment thereof which I have selected for illustration in the accompanying drawings and description in this specification, I provide a frame 11, adapted to support in position the various parts to be hereinbelow described. At the upper part of the apparatus is a hopper 12, adapted to receive immature or frost-bitten cotton bolls as they come from the field, and as here shown is provided with two outlets, 13 and 14, in order that a larger quantity of bolls may be handled than would be the case if a single outlet only were employed.

These outlets open into chambers 15 and 16, which contain stationary annular brushes 17 and 18. I provide a shaft 19, driven by a pulley 20, and journaled in bearings 21 having circular rotary brushes 22 and 23, mounted thereon, and adjustable longtudinally thereon by means of sleeves 24 and 25.

The chambers 15 and 16 open peripherally into a suction chamber 26, provided with an exhaust fan located at 27. This suction chamber in turn opens into a rotary conical sieve 28, mounted on a shaft 29, which is driven by means of a pulley 30. A hopper 31 is so placed as to receive all bolls which on account of their smaller size fall through the sieve, and a hopper 32 receives all the larger bolls, which pass out at the lower end. At the outlet of the hopper 31 I place a pair of rollers 33 and 34, while at the outlet of the hopper 32 I place a second pair of rollers 35 and 36, spaced somewhat farther apart than the rollers 33 and 34, both hoppers emptying into a chute 37. It will of course be understood that the spacing of the rollers may be adjustable, also that suitable means for rotating said rollers is provided.

The operation of my invention will now be described.

Immature or frost-bitten cotton bolls as they come from the field are placed in the hopper 12, and pass downward through the outlets 13 and 14 into the chambers 15 and 16, where they are subjected to friction between the stationary and rotary brushes contained therein, which are placed near enough together to thoroughly clean all the cotton bolls which pass through these chambers of the adherent leaves, &c. Under the influence of gravity and centrifugal force, the cotton bolls eventually pass into the suction chamber 26, all the leaves having been by that time rubbed off. It will be understood that occasionally, as the brushes become worn, they should be placed nearer together, also that it is unnecessary to provide two sets of brushes, although the efficiency and output of the machine is increased by so doing.

As the bolls pass through the suction chamber 26, the leaves or trash are sucked out through the opening 27 by means of the exhaust fan placed therein, the bolls falling directly into the sieve 28.

In the sieve 28, the bolls are sorted into two sizes. Cotton bolls as they come from the field vary somewhat in size, and it is desirable to insure that every boll should be cracked without running any risk of clogging the cracking rollers. The bolls which will pass through the meshes of the sieve 28 drop into the hopper 31 and are cracked between the rollers 33 and 34 sufficiently so that the moisture within may evaporate when subjected to heat. All bolls which are too large to pass through the sieve drop out at the lower end into the hopper 32, and are similarly cracked between the wider-spaced rollers 35 and 36. All the bolls eventually pass out through the chute 37 and may then be suitably dried.

Having thus described my invention what I claim as new and desire to secure by Letters Patent is as follows:

1. The process of treating frost-bitten or immature cotton bolls which consists in subjecting the bolls to friction, separating the bolls and trash, and cracking the bolls preparatory to maturing the same.

2. The process of treating frost-bitten or immature cotton bolls, which consists in subjecting the bolls to friction, separating the bolls and trash by means of an air current, and cracking the bolls preparatory to maturing the same.

3. The process of treating frost-bitten or immature cotton bolls which consists in subjecting the bolls to friction, separating the bolls and trash, sorting the bolls into a plurality of portions according to size, and cracking the bolls preparatory to maturing the same.

4. In an apparatus for treating frost-bitten or immature cotton bolls, the combination with a supporting frame and a hopper; of a friction chamber connected with said hopper, a suction chamber connected with said friction chamber, and means adapted to crack said bolls preparatory to maturing the same.

5. In an apparatus for treating frost-bitten or immature cotton bolls, the combination with a supporting frame and a hopper; of a friction chamber connected with said hopper, a suction chamber connected with said friction chamber, a sieve adjacent said suction chamber, and a plurality of means adapted to operate upon bolls of different sizes, and crack the said bolls preparatory to maturing the same.

6. In an apparatus for treating frost-bitten or immature cotton bolls, the combination with a supporting frame and a hopper; of a plurality of friction chambers connected with said hopper, a suction chamber connected with said friction chambers, and means adapted to crack said bolls preparatory to maturing the same.

7. In an apparatus for treating frost-bitten or immature cotton bolls, the combination with a supporting frame and a hopper; of a friction chamber connected with said hopper, a suction chamber connected with said friction chamber and provided with an exhaust fan, and means adapted to crack said bolls preparatory to maturing the same.

8. In an apparatus for treating frost-bitten or immature cotton bolls, the combination with a supporting frame and a hopper; of a friction chamber connected with said hopper, a suction chamber connected with said friction chamber, and a pair of rollers adapted to crack said bolls preparatory to maturing the same.

9. In an apparatus for treating frost-bitten or immature cotton bolls, the combination with a supporting frame and a hopper; of a friction chamber connected with said hopper, a suction chamber connected with said friction chamber, a sieve adjacent said suction chamber, and a plurality of pairs of rollers adapted to crack said bolls preparatory to maturing the same.

10. In an apparatus for treating frost-bitten or immature cotton bolls, the combination with a supporting frame and a hopper; of a plurality of friction chambers connected with said hopper, a suction chamber connected with said friction chambers, and a pair of rollers adapted to crack said bolls preparatory to maturing the same.

11. In an apparatus for treating frost-bitten or immature cotton bolls, the combination with a supporting frame and a hopper; of a friction chamber connected with said hopper, a suction chamber connected with said friction chamber and provided with an exhaust fan, and a pair of rollers adapted to crack said bolls preparatory to maturing the same.

12. In an apparatus for treating frost-bitten or immature cotton bolls, the combination with a supporting frame and a hopper; of a friction chamber connected with said hopper and provided with a stationary brush and a rotary brush, a suction chamber connected with said friction chamber, and means adapted to crack said bolls.

13. In an apparatus for treating frost-bitten or immature cotton bolls, the combination with a supporting frame and a hopper; of a friction chamber connected with said hopper and provided with a central inlet and a peripheral outlet, a suction chamber connected with said friction chamber, and means adapted to crack said bolls preparatory to maturing the same.

14. In an apparatus for treating frost-bitten or immature cotton bolls, the combination with a supporting frame and a hopper; of a friction chamber connected with said hopper and provided with a central inlet, an annular stationary brush, and a rotary brush; a suction chamber connected with said friction chamber; and means adapted to crack said bolls.

15. In an apparatus for treating frost-bitten or immature cotton bolls, the combination with a supporting frame and a hopper; of a friction chamber connected with said hopper and provided with a stationary brush and an adjustable rotary brush, a suction chamber connected with said friction chamber, and means adapted to crack said bolls.

16. An apparatus for treating cotton bolls, comprising a casing having a stationary and a rotatable disk, said rotatable disk having bristles on one side thereof, means to feed the bolls between said disks near their central portions, crushing rolls to which the bolls are discharged from said casing, and actuating means for said rotatable disk and said crushing rolls.

In witness whereof I have hereunto signed my name this 25th day of October, 1915.

JAMES CARLTON PATTERSON.

Copies of this patent may be obtained for five cents each, by addressing the "Commissioner of Patents, Washington, D. C."